(12) United States Patent
Marupaduga et al.

(10) Patent No.: US 10,051,525 B1
(45) Date of Patent: Aug. 14, 2018

(54) CONTROLLING RELAY-UE OPERATION BASED ON BEARER CONTENT TYPE

(71) Applicant: Sprint Spectrum L.P., Overland Park, KS (US)

(72) Inventors: Sreekar Marupaduga, Overland Park, KS (US); Nitesh Manchanda, Overland Park, KS (US); Vanil Parihar, Overland Park, KS (US); Saravana Velusamy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 139 days.

(21) Appl. No.: 15/195,026

(22) Filed: Jun. 28, 2016

(51) Int. Cl.
*H04W 36/00* (2009.01)
*H04L 5/00* (2006.01)

(52) U.S. Cl.
CPC ....... *H04W 36/0022* (2013.01); *H04L 5/0007* (2013.01); *H04W 36/0011* (2013.01)

(58) Field of Classification Search
CPC .......... H04W 36/0022; H04W 36/0011; H04L 5/0007
See application file for complete search history.

(56) References Cited

U.S. PATENT DOCUMENTS

| | | | |
|---|---|---|---|
| 2007/0242647 A1* | 10/2007 | Bennett | H04W 88/04 370/338 |
| 2008/0013480 A1 | 1/2008 | Kapoor et al. | |
| 2008/0108367 A1* | 5/2008 | Afrashteh | H04W 48/18 455/452.2 |
| 2008/0254833 A1 | 10/2008 | Keevill et al. | |
| 2009/0296835 A1 | 12/2009 | Hidaka | |
| 2010/0093281 A1 | 4/2010 | Khanka et al. | |
| 2013/0109372 A1 | 5/2013 | Ekici | |
| 2015/0222408 A1* | 8/2015 | Yerramalli | H04L 5/0055 370/228 |

FOREIGN PATENT DOCUMENTS

WO     2016059063 A1     4/2016

OTHER PUBLICATIONS

Daveshkumar N. Rai et al., U.S. Appl. No. 14/507,128, filed Oct. 6, 2014, 37 pages.
First Action Interview Pilot Program Pre-Interview Office Action dated Mar. 16, 2016 of U.S. Appl. No. 14/507,128, filed Oct. 6, 2014.
Siddharth S. Oroskar et al., U.S. Appl. No. 15/005,313, filed Jan. 25, 2016, 41 pages.

* cited by examiner

*Primary Examiner* — Walter J Divito

(57) ABSTRACT

A method and system are disclosed for a base station to manage air interface communications with a user equipment device (UE) served by the base station. The base station will determine whether the served UE is a relay-UE that provides wireless backhaul connectivity for a relay base station and whether the relay base station serves at least a threshold extent of delay-sensitive communication traffic. Based on a determination that the served UE is a relay-UE and that the relay base station serves at least the threshold extent of delay-sensitive communication traffic, the base station will responsively cause the relay-UE to be served by the base station on a particular carrier frequency, in an effort to reduce a total delay resulting from the wireless relay arrangement.

20 Claims, 3 Drawing Sheets

CONTROLLING RELAY-UE OPERATION BASED ON BEARER CONTENT TYPE

BACKGROUND

A typical wireless network includes a number of base stations each radiating to provide coverage in which to serve user equipment devices (UEs) such as cell phones, tablet computers, tracking devices, embedded wireless modules, and other wirelessly equipped devices, whether or not user operated. In turn, each base station may be coupled with a switch or gateway that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, such a network may operate in accordance with a particular radio access protocol, examples of which include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1×RTT and 1×EV-DO), Global System for Mobile Communications (GSM), IEEE 802.11 (WIFI), BLUETOOTH, and others. Each protocol may define its own procedures for registration of UEs, initiation of communications, handover between base station coverage areas, and other functions.

Each base station may provide wireless service to UEs on one or more carrier frequencies (carriers), each of which could be frequency division duplex (FDD), defining separate frequency channels for downlink and uplink communication, or time division duplex (TDD), defining a frequency channel multiplexed over time between downlink and uplink use. Each carrier or its respective channels could be within a defined frequency band and could be of a particular frequency bandwidth, such as 5 MHz, 10 MHz, or 20 MHz for instance, defining a certain extent of air interface resources. A given base station could be arranged to serve a UE on a single such carrier at a time or, with carrier aggregation service or the like, on multiple such carriers at a time.

Further, each base station in such a network may be communicatively linked with a signaling controller that carries out various network control functions, such as managing setup of bearer connections between the base station and one or more transport networks, tracking where UEs are located in the network, paging UEs, and the like. In addition, neighboring base stations may be communicatively linked with each other, to facilitate handover and other inter-base station signaling.

By way of example, in an LTE network, each base station (LTE evolved Node-B (base station)) has a communication interface with a signaling controller known as a mobility management entity (MME), the base station and MME each also have a respective communication interface with a gateway system that provides connectivity with a packet-switched transport network, and the base station has a communication interface with each of its neighboring base stations. Typically, the nodes of such an LTE network would sit on a wireless service provider's core packet-switched network (e.g., a network compliant with the industry standard system architecture evolution (SAE) for the LTE protocol), and so the base station and each other network entity (e.g., MME, gateway, and neighboring base station) may each have an assigned Internet Protocol (IP) address on that network, and the interfaces between these entities may be defined as logical connections (e.g., established virtual tunnels) through that network.

In example operation, when a UE enters into coverage of an LTE base station on a particular carrier, the UE signals to the base station to initiate an attach process and to establish a radio-link-layer connection with the base station. In this process, the base station signals to the MME, the MME authenticates the UE, the MME and base station obtain and store a context/profile record for the UE, and the gateway system assigns an IP address to the UE for use by the UE to communicate on the packet-switched transport network. Further, at this point or later, the MME may engage in signaling with the base station and the gateway system to establish for the UE one or more bearers for carrying packet data between the UE and the transport network.

Once a UE is so attached with a base station, the base station then serves the UE on one or more carriers, managing downlink communication of packet data to the UE and uplink communication of packet data from the UE. For example, as the gateway system receives packet data destined to the UE, the gateway system may forward the packet data to the base station, and the base station may schedule and provide transmission of that data to the UE on the UE's serving carrier(s). Likewise, as the UE has packet data to transmit on the transport network, the UE may transmit a scheduling request to the base station, the base station may schedule transmission of that data from the UE on the UE's serving carrier(s), the UE may accordingly transmit the data to the base station, and the base station may then forward the data to the gateway system for output on the transport network.

Optimally, a wireless service provider will strategically implement base stations throughout a market area so that served UEs can move between the base station coverage areas without loss of coverage. Each base station may include an antenna structure and associated equipment, and the wireless service provider may connect the base station by a landline cable (e.g., a T1 line) with the service provider's network infrastructure to enable the base station to communicate with a signaling controller (e.g., MME), gateway system, other base stations, and the like.

In practice, however, it may be impractical for a wireless service provider to run landline connections to base stations in certain locations. For instance, where a service provider seeks to provide many small coverage areas blanketing a market area or to fill in coverage holes between coverage of other base stations, the service provider may implement many small-cell base stations throughout the market area, but it may be inefficient or undesirable to run landline cables to every one of those small-cell base stations.

To connect a base station with the network infrastructure in such a situation, the wireless service provider may implement a wireless backhaul connection between the base station and another base station of the service provider's network. In this situation, the base station at issue operates as a relay base station, and the other base station operates as a donor base station. In practice, the relay base station includes or is coupled (e.g., via a local area network or other connection) with a UE, referred to as a relay-UE, and the donor base station then serves the relay-UE in much the same way that the donor base station serves other UEs. Further, the relay base station itself serves UEs, in much the same way that any base station would.

With this arrangement, when the relay-UE attaches with the donor base station, the relay-UE may acquire connectivity and an IP address as discussed above for instance. But based on a profile record for the relay-UE, the network (e.g., a signaling controller) may recognize that the relay-UE is a relay-UE (rather than a normal end-user UE) and may therefore set up a bearer connection for that relay-UE with a special core network gateway system (e.g., "SAE GW") that provides for internal core network connectivity and assigns the relay-UE with an IP address for use to communicate within the core network. Once the relay-UE receives that core network IP address assignment, the relay-UE may then convey that IP address to the relay base station for use by the relay base station as the relay base station's IP address on the core network. The relay base station may then operate as a full-fledged base station of the network, having IP-based interfaces with other core network entities (e.g., a signaling controller, a gateway system, and other base stations), albeit with those interfaces passing via the wireless backhaul connection provided by the relay-UE, and via the core network gateway system.

Once the relay base station is thus in operation, the relay base station may then serve UEs in the same way as a standard base station serves UEs. Thus, when a UE enters into coverage of the relay base station, the UE may signal to the relay base station to initiate an attach process, the UE may acquire an IP address, and an MME may engage in signaling to establish one or more bearers between the UE and a gateway system. Each of these bearers, though, like the relay base station's signaling communication, would pass via the relay's wireless backhaul connection.

Overview

Normally, when a base station having an IP address on the core network communicates with other entities on the core network, such as with a signaling controller, a gateway system, and other base stations, the communication will be relatively quick. Unfortunately, however, if the base station is a relay base station that has a wireless backhaul connection with the core network, communications between the relay base station and other entities on the core network may experience delay. One source of this delay may be the process of scheduling and engaging in communication over the wireless backhaul connection between the donor base station and the relay-UE. Another source of this delay may be the routing of such communications through a special core network gateway system as noted above.

Further, when a base station such as a donor base station schedules transmission of packet data over the air to or from a served UE such as a relay-UE, if the receiving end (the UE or base station) does not successfully receive the transmitted packet data, the receiving end may then ask the transmitting end (the base station or UE) to re-transmit. After some defined delay period such as four milliseconds for instance, the transmitting end may then responsively re-transmit to the receiving end. And this request/re-transmission process may repeat some defined number of times until the receiving end determines that it has successfully received the data. (Each re-transmission in this process could be of the same data or could be just a portion of the same data together with some error-correction coding, and the receiving end could maintain a copy of any portion of the transmission it receives in instance transmission attempt, so as to try to uncover the intended data transmission based on a combination of the multiple transmission attempts.)

Due to these or other factors, the wireless relay arrangement could add on the order of 10 to 20 milliseconds of delay to communications between a relay base station and other core network entities. While such delay may not be problematic for some types of communication, the delay could be especially problematic for communications that are delay sensitive, such as voice over Internet Protocol (VoIP) content (e.g., voice over LTE (VoLTE)), or other real-time content such as gaming content and video calling content, among other possibilities. Consequently, an improvement is desired.

Disclosed herein is a method and system for a donor base station to manage air interface communications with a UE that is served by the donor base station, taking into account whether the UE is a relay-UE that provides wireless backhaul connectivity for a relay base station and whether the relay base station serves a threshold extent of delay-sensitive communication traffic. The donor base station will determine whether the served UE is a relay-UE and whether the relay base station for which the relay-UE provides wireless backhaul connectivity serves a threshold extent of delay-sensitive communications. Based on a determination that the served UE is a relay-UE and that the relay base station serves at least the threshold extent of delay-sensitive communications, the donor base station will responsively invoke a process to help expedite air interface communications with the served relay-UE in an effort to reduce the total delay resulting from the wireless relay arrangement. In particular, the donor base station will serve the relay-UE on a particular carrier frequency to help expedite the air interface communications between the donor base station and the relay-UE.

In practice, a particular carrier frequency on which a base station transmits bearer communication may have an impact on the quality of bearer service. For instance, bearer communication on lower carrier frequencies may facilitate higher channel quality and decreased packet loss during bearer communication by providing improved radio frequency propagation or the like, and may thereby likely increase bearer communication quality. In contrast, bearer communication on higher carrier frequencies may result in channel quality degradation and higher packet losses by providing reduced radio frequency propagation or the like, and may thereby decrease bearer communication quality.

Thus, by serving a relay-UE on a low frequency carrier, a donor base station can help to expedite air interface transmission between the relay-UE and the donor base station by increasing a success rate of transmissions between the relay-UE and the donor base station and thereby reducing a number of re-transmissions between the relay-UE and the donor base station. This may reduce or minimize the overall delay of communications to or from a relay base station and may be particularly desirable in arrangements where the relay base station serves at least a threshold extent of delay-sensitive communication traffic (e.g., VoIP traffic).

Accordingly, in one respect, disclosed is a method for managing wireless backhaul communication between a donor base station and a relay, where the relay includes a relay-UE and a relay base station, where the donor base station serves the relay-UE over an air interface defining a wireless backhaul connection for the relay, and where the relay base station serves one or more UEs. In accordance with the disclosure, the method includes determining that the relay-UE is a relay-UE rather than an end-user UE and determining that the relay base station serves at least a threshold extent of delay-sensitive communication traffic, and, based on the relay-UE being a relay-UE rather than an end-user UE and based on the relay base station serving at least the threshold extent of delay-sensitive communication traffic, selecting a particular carrier frequency on which to serve the relay-UE. Further, the method includes causing the relay-UE to be served on the selected carrier frequency.

In another respect, disclosed is a base station that includes a transmitter for transmitting downlink air interface communications in a plurality of downlink channels, a receiver for receiving uplink air interface communications in a plurality of uplink channels, and a controller. In accordance with the disclosure, the controller is configured to (i) determine that a UE served by the base station is a relay-UE rather than an end-user UE, (ii) determine that the base station transmits at least a threshold extent of delay-sensitive communication traffic to the UE, (iii) based on the relay-UE being a relay-UE rather than an end-user UE and the second base station serving at least the threshold extent of delay-sensitive communication traffic, select a particular carrier frequency on which to serve the UE, and (iv) cause the relay-UE to be served on the selected carrier frequency.

In yet another respect, disclosed is a wireless communication system that includes a first base station configured to serve UEs over a first air interface. The communication system further includes a relay, and the relay includes a relay-UE and a second base station. Within the wireless communication system, the first base station is configured to serve the relay-UE over the first air interface, and the second base station is configured to serve UEs over a second air interface. In accordance with the disclosure, the first base station is further configured to (i) determine that the relay-UE is a relay-UE rather than an end-user UE (i.e., determine that the UE the first base station is serving is a relay-UE rather than a non-relay-UE), (ii) determine that the second base station serves at least a threshold extent of delay-sensitive communication traffic, (iii) based on the relay-UE being a relay-UE rather than an end-user UE and the second base station serving at least the threshold extent of delay-sensitive communication traffic, select a particular carrier frequency on which to serve the UE, and (iv) cause the relay-UE to be served on the selected carrier frequency.

This overview is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The present method and apparatus will be described herein in the context of LTE as an example radio access protocol and associated network arrangement. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processing unit executing software instructions for instance.

Figure 1:
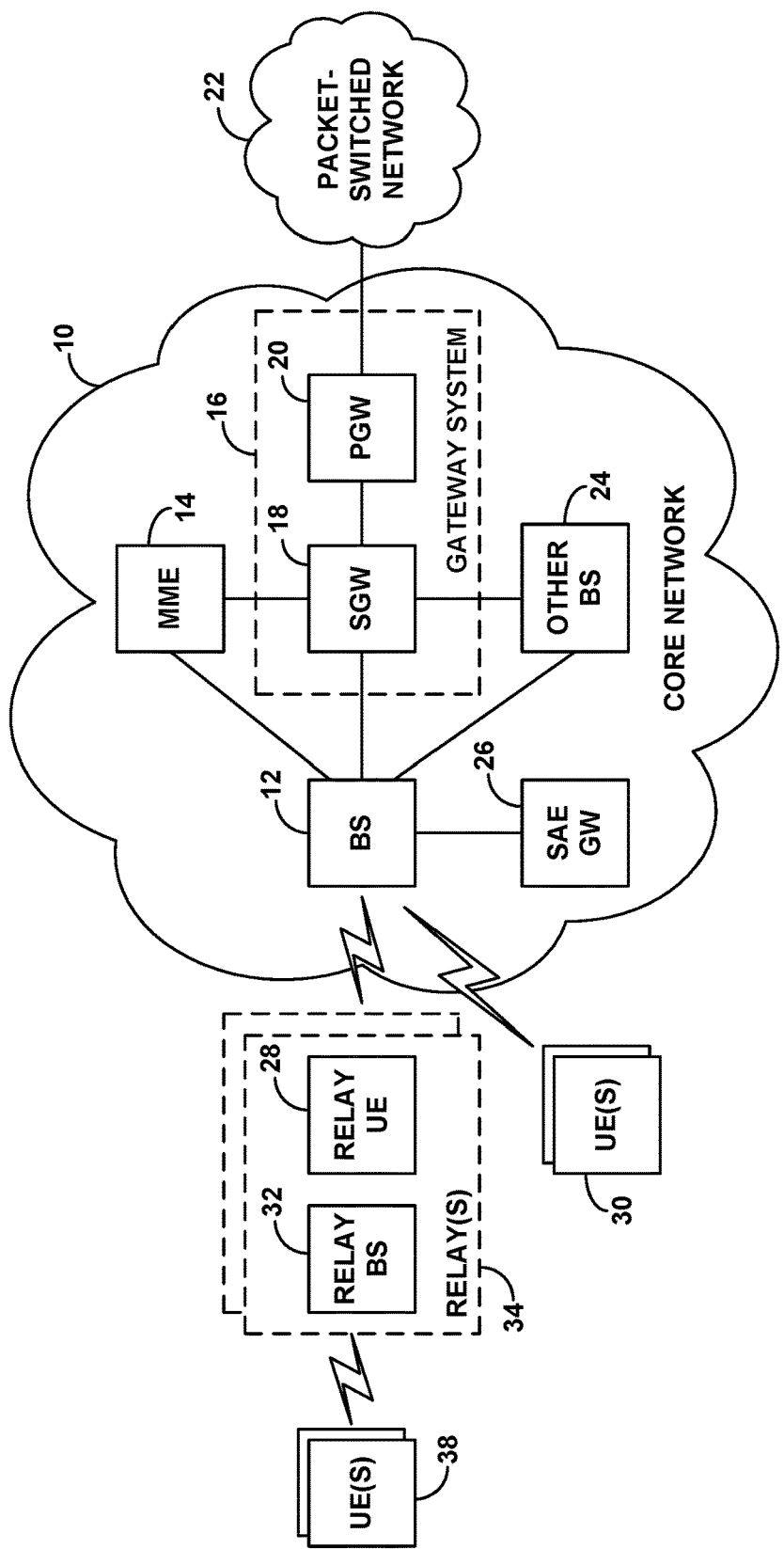
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE core network 10, which functions primarily to serve UEs with wireless packet data communication service, including possibly voice-over-packet service, but may also provide other functions. The core network 10 may be a packet-switched network, compliant with the industry standard system architecture evolution (SAE) for the LTE protocol.

As shown, network 10 includes an example base station (BS) 12, which has an antenna structure and associated equipment (not shown) for providing LTE coverage in which to serve the UEs. The base station 12 then has communication interfaces with an example MME 14, functioning as a signaling controller for the network 10. Further, the base station 12 has a communication interface with a gateway system 16, which includes a serving gateway (SGW) 18 and a packet-data-network gateway (PGW) 20. The PGW 20 provides connectivity with a packet-switched transport network 22 such as the Internet, and the MME 14 has a respective communication interface with the SGW 18 as well. In addition, the base station 12 has a communication interface, such as an industry standard X2 interface, with another base station 24.

As further shown, by way of example, network 10 then also includes, and base station 12 has an interface with, a special core network gateway depicted as an "SAE GW" 26, which serves to provide connectivity within the network 10 for a relay-UE and relay base station as noted above for instance.

Additionally shown in FIG. 1, within coverage of base station 12, are a plurality of UEs, including at least one relay-UE 28 and at least one non-relay UE 30. Each non-relay UE 30 may be an end-user UE such as one of the types of UEs noted above (e.g., cell phone, tablet computer, tracking device, etc.) that is not set to provide wireless backhaul connectivity for a relay base station. In contrast, each relay-UE 28 may be a UE that is set to provide wireless backhaul connectivity for a relay base station 32. As such, a relay-UE could be a conventional UE (e.g., cell phone or the like) that is locally coupled with a relay base station (e.g., via a local area network or direct cable or wireless connection) and that is configured to operate as a relay-UE for the relay base station, or the relay-UE 28 could be a UE module that is incorporated within a base station, thereby allowing the base station to obtain wireless backhaul connectivity and thus function as a relay base station. FIG. 1 thus further depicts relay UE-28 and relay base station 32 cooperatively defining a relay 34. As such, base station 12 serves as a donor base station for relay 34 and as a conventional base station for each non-relay UE 30, relay 34 has a wireless backhaul connection 36 with the donor base station 12, and relay 34 then provides its own wireless coverage for serving one or more other UEs 38.

In practice, each of these UEs may be configured within the network 10 as a device to be served by the network (such as an authorized subscriber device), and a mechanism may be provided to distinguish relay-UEs from conventional UEs, so as to facilitate treating relay-UEs differently than conventional UEs. By way of example, a relay-UE may have a special identifier or operate and be served by the network under a special network identifier (e.g., a special public land mobile network (PLMN) identifier, or special packet data network (PDN) connection identifier), indicating that the relay-UE will be operating as a relay-UE. Whereas a conventional UE may have an identifier or be served by the network under an identifier that does not indicate the UE will be operating as a relay-UE and thus that may establish the UE is not a relay-UE. Accordingly, when a UE attaches with the network 10, such as with base station 12, the network 10 (e.g., the base station, MME, and/or other network entity) may determine whether the UE is a relay-UE (i.e., whether the UE provides wireless backhaul connectivity for a relay base station) or not, based on such identification or other information provided by the UE during attachment or noted in a network profile record for the UE.

In an LTE network such as this, when base station 12 is put in service, base station 12 may acquire an IP address for use within the network 10. Further, base station 12 may then engage in signaling ((stream control transmission protocol (SCTP) signaling) with the MME 14 to establish an S1-AP connection (S1-AP interface) with the MME 14. To facilitate this, the base station 12 may be pre-provisioned with data specifying the IP address of the MME 14 so that base station 12 can engage in signaling with the MME 14 to set up such a connection. This S1-AP connection with the MME 14 then serves as a signaling channel between base station 12 and the MME 14.

When a UE (such as UE 28 or UE 30) initiates attachment with base station 12, base station 12 may then signal to the MME 14 to trigger establishment for the UE of an S1-MME connection (S1-MME interface) between base station 12 and the MME 14. Further, this signaling also causes the MME 14 to engage in signaling to establish some other connections for the UE, which may vary based on whether the UE is a conventional UE or rather a relay-UE (e.g., as indicated by the UE's PLMN identifier or other data). If the UE is a conventional UE, then the MME 14 may engage in signaling with base station 12 and the SGW 18 to establish for the UE an S1-U connection (S1-U interface) between base station 12 and the SGW 18 and an S5 connection (S5 interface) between the SGW 18 and the PGW 20, and PGW 20 may assign to the UE an IP address for use on external packet-switched network 22. Whereas, if the UE is a relay-UE, then the MME 14 may engage in signaling with base station 12 and SAE GW 26 to establish for the UE an S1-U connection between base station 12 and the SAE GW 26 and, internally within the SAE GW 26, an S5 connection, and the SAE GW 26 may assign to the UE an IP address for use internally within the core network 10.

In line with the discussion above, once relay-UE 28 acquires connectivity with donor base station 12 and receives an IP address assignment, the relay-UE 28 may then provide that IP address to its relay base station 32, so that the relay base station 32 can use that IP address as its own address for communicating with other entities in the core network 10. The relay UE 28 and relay base station 32 may each be programmed with processor logic to facilitate this. Once the relay base station 32 thus has an IP address on the core network 10, communications that the relay base station 32 has in the core network 10 may pass via a tunnel through (i) the relay-UE 28, (ii) the radio link between the relay-UE 28 and the donor base station 12, and (iii) the SAE GW 26.

When the relay base station 32 thus acquires an IP address in the core network 10, the relay base station 32, like base station 12 on the core network, will form an S1-AP connection with an MME (which could be the same or different than that used by base station 12). To facilitate this, the relay base station 32 may be pre-provisioned with data specifying the IP address of the MME so that the relay base station 32 can engage in signaling with the MME to set up such a connection, via the SAE GW 26. This S1-AP connection with the MME then serves as a signaling channel between the relay base station 32 and the MME.

Further, when one or more UEs 38 initiate attachment with relay base station 32, relay base station 32 may then signal to the MME to trigger establishment for each of the UEs 38 of an S1-MME connection between the relay base station 32 and the selected MME, an S1-U connection between the relay base station 32 and the SGW 18, and an S5 connection between the SGW 18 and the PGW 20, with PGW 20 assigning to each of the UEs 38 an IP address for use on external packet-switched network 22, again with all of these connections passing, by way of example, via (i) the relay-UE 28, (ii) the radio link between the relay-UE 28 and the donor base station 12, and (iii) the SAE GW 26.

Once the UEs 38 are attached with relay base station 32, the UEs 38 may engage in communication with various remote communication-entities, such as servers or other end-user devices, on or via network 22. These entities may take various forms and may be configured to communicate different types of content including delay-sensitive traffic such as voice and other real-time media communications. By way of example, one entity may be a voice-call server such as an Internet Multimedia Subsystem (IMS) platform that provides voice-call services for UEs (e.g., one or more entities of the IMS platform may help facilitate a VoLTE call), and another entity may be a data server such as a web server, e-mail server, streaming video server, game server, or the like. Other examples are possible as well.

In line with the discussion above, in order for UE 38 to communicate over the transport network 22, the core network 10 may establish for UE 38 one or more bearers for carrying packet data between UE 38 and the transport network 22. Bearers can be classified into two types based on the nature of the quality of service (QoS) they provide: minimum guaranteed-bit-rate (GBR) bearers and non-GBR bearers. Further, each bearer may have a particular class of service defined by a QoS class identifier (QCI) level, for carrying a particular class or type of data. QCI levels may be designated by QCI numbers ranging from 1 to 9, for instance, with QCI levels 1 through 4 being for GBR bearer communications of various types and QCI levels 5 through 9 being for non-GBR bearer communications of various types.

In typical practice, the LTE network 10 may establish for UE 38 at least a non-GBR default Internet bearer for carrying general "best efforts" data traffic (such web browsing traffic, File Transfer Protocol (FTP) traffic, and messaging traffic) between UE 38 and various remote network entities. Further, if UE 38 subscribes to VoIP service such as VoLTE service, the LTE network 10 may establish for UE 38 a non-GBR, IMS signaling bearer (e.g., QCI level 5) for carrying VoLTE call setup signaling such as Session Initiation Protocol (SIP) signaling between the UE and the IMS platform. In turn, after the initial attach process, the LTE network 10 may then establish for UE 38 a GBR dedicated bearer such as an IMS dedicated bearer for carrying VoLTE traffic (e.g., QCI level 1) (namely, data traffic representing speech) between UE 38 and the network 10.

As noted above, bearer traffic to be communicated on a particular established bearer can be designated as delay-sensitive traffic based on its content type. Further, bearer traffic may be designated as delay-sensitive traffic at various levels of granularity. For example, bearer traffic may be designated as delay-sensitive traffic based on its specific content (e.g., if it includes VoIP content, gaming content, real-time media content, or the like). Alternatively, bearer traffic may be designated as delay-sensitive based on its QCI level, with which multiple specific content types of bearer traffic can be communicated.

In some UE-initiated bearer establishment scenarios, when UE 38 transmits an initial attach request to relay base station 32 to establish a particular bearer, UE 38 may specify in the attach request a QCI level for the particular bearer. In response to relay base station 32 receiving the attach request, the LTE network 10 may establish the particular bearer, which can then be used for carrying bearer traffic supported by the particular bearer. For instance, UE 38 may specify in the attach request a QCI level 5, and the LTE network 10 may responsively establish an IMS signaling bearer, which can then be used for carrying VoLTE call setup signaling. During or after establishment of the particular bearer, MME 14 or another entity of the LTE network 10 may assign a bearer ID for the particular bearer. Relay base station 32 may then store, in a context record for the particular bearer (keyed to the particular bearer's bearer ID), a specification of the QCI level of the particular bearer.

As another example, at the time of bearer establishment, bearer setup signaling that passes from PGW 20 to relay base station 32 (through MME 14 and the wireless backhaul connection provided by relay-UE 28 and donor base station 12) may include a bearer ID (e.g., a three bit value) and may also include a traffic flow template (TFT) that specifies source and/or destination IP addresses and port numbers that are allowed for packet data communication on the bearer that is being established. For instance, during set up of a dedicated QCI level 1 bearer for carrying VoLTE traffic, the TFT may specify an IP address that PGW 20 has assigned to UE 38 for engaging in VoLTE communication and may further specify an IP address of the IMS platform with which UE 38 will engage in VoLTE communication. Accordingly, relay base station 32 may restrict communication on the dedicated QCI level 1 bearer to be just to and/or from those specified IP addresses. Relay base station 32 may then store, in a context record for the dedicated QCI level 1 bearer (keyed to its bearer ID), a specification of the IP addresses permitted for the dedicated QCI level 1 bearer. Other TFTs are possible as well, where the other TFTs may specify one or more other IP addresses and/or port numbers that correspond to other types of bearer traffic.

As still another example, once one or more bearers are established for UE 38, relay base station 32 and UE 38 may engage in further signaling that may indicate to relay base station 32 a content type of bearer traffic that may be communicated on the established bearer(s). For instance, at some point while relay base station 32 is serving UE 38 on a particular established bearer that can support one or more different content types of bearer traffic, UE 38 may transmit via an uplink control channel to relay base station 32 a message for the particular bearer that specifies a bearer ID for the particular bearer and indicates a particular content type of bearer traffic supported by the particular bearer. Relay base station 32 may then store the indicated particular content type in a context record for the particular bearer (keyed to its bearer ID).

In an LTE system arranged as discussed above, a base station may be configured to operate on a given set of carrier frequencies. When a UE attaches to the base station, the base station may select a carrier frequency from the given set on which to serve the UE. The base station may select a particular carrier frequency based on various factors, such as a load level of the particular carrier frequency compared to other carrier frequencies. Other factors may be possible as well.

In accordance with the present disclosure, a base station in a system such as this may be configured to select a particular carrier frequency on which to serve a UE in a manner that may improve bearer service to UEs directly or indirectly served by the base station. In particular, a donor base station (e.g., donor base station 12) having a set of carriers ranging from a lowest carrier to a highest carrier may be configured to determine that a served UE (e.g., relay-UE 28) is a relay-UE rather than an end-user UE. Within examples, a relay-UE may be any UE that is set up to provide wireless backhaul connectivity for a relay base station; an end-user UE may be any UE that is not set up to provide wireless backhaul connectivity for a relay base station and is not necessarily associated with a user. The donor base station may also be configured to determine that the relay-UE provides a wireless backhaul connection for a relay base station (e.g., relay base station 32), and that the relay base station serves at least a threshold extent of delay-sensitive traffic (e.g., to and/or from UEs 38). Based on these determinations, the donor base station may be configured to select a carrier frequency within a low frequency carrier range and subsequently serve the relay-UE on the selected carrier frequency. As noted above, serving the relay-UE on a low frequency carrier may help to expedite air interface transmission between the relay-UE and the donor base station by increasing a success rate of transmissions between the relay-UE and the donor base station.

In practice, in order to determine the extent of delay-sensitive traffic served by relay base station 32, relay base station 32 may refer to a context record for one or more bearers established for UEs 38 (keyed to each bearer's bearer ID). Relay base station 32 can then determine from data stored in the context records a particular content type that is and/or was transmitted on each bearer. For instance, a context record may indicate a QCI of a particular bearer communication, and, based on the indicated QCI, relay base station 32 may determine that a particular bearer communication includes delay-sensitive traffic. In another example, a context record may indicate one or more IP addresses associated with a bearer communication, and, based on the IP address(es), relay base station 32 may determine that a particular bearer communication includes delay-sensitive traffic. In yet another example, a context record may identify a bearer content type (e.g., VoIP or other real-time media content), and, based on the bearer content type, relay base station 32 may determine that a particular bearer communication includes delay-sensitive traffic.

It should be understood that an extent of delay-sensitive traffic served by relay base station 32 may be determined or otherwise learned by relay base station 32 in other manners. For example, a network entity in a data communication path with UEs 38 that are served by relay base station 32 (e.g., relay base station 32, SAE GW 26, donor base station 12, MIME 14, SGW 18, or PGW 20) may perform deep packet inspection to learn an amount of data having a particular content type (e.g., VoIP content) is being, or has previously been, served by relay base station 32. Namely, that network entity may read the payload of one or more packets transmitted between each of UEs 38 and the packet-switched network 22 and programmatically determine whether each payload indicates a delay-sensitive content type of bearer traffic and, if so, the size of the payload. In scenarios where that network entity is not relay base station 32, for instance, that network entity may then inform relay base station 32 that the payload indicates the content type of bearer traffic. Other examples are possible as well.

Accordingly, by referring to its context records or by performing deep packet inspection, relay base station 32 may determine an extent of delay-sensitive traffic served to UEs 38. For instance, based on its context records or by way of deep packet inspection, relay base station 32 may determine a number of its served UEs 38 that are capable of receiving delay-sensitive traffic. In particular, relay base station 32 may determine how many of UEs 38 are currently engaged in, or have previously engaged in, bearer communication associated with a particular QCI, a particular IP address or range of IP addresses, and/or a particular content type (e.g., VoIP or other real-time media content). As another example, relay base station 32 may determine an amount (e.g., a bandwidth, a number of data packets, a storage size, etc.) of data associated with a particular QCI, a particular IP address or range of IP addresses, and/or a particular content type that relay base station 32 is currently serving, or has previously served, to UEs 38.

Further, when determining the extent of delay-sensitive traffic served to UEs 38, relay base station 32 may weigh certain bearer content types more heavily than others. For instance, while bearer communications including VoIP content and bearer communications including real-time gaming content may both be considered delay-sensitive traffic, the VoIP content may be weighted more heavily than the real-time gaming content. Similar weighting methods may be applied based on a QCI or IP address associated with a bearer communication as well. As such, a given extent of delay-sensitive traffic may equate to varying amounts of bearer traffic based on a content type, QCI, and/or IP address associated with the bearer traffic.

Relay base station 32 may further determine whether the determined extent of delay-sensitive traffic served to UEs 38 is threshold high. For instance, such a determination may include relay base station 32 determining from its context records that it is serving at least a threshold number of UEs 38 that are capable of receiving a particular type of bearer traffic, such as VoIP traffic or some other delay-sensitive traffic. In another example, such a determination may include relay base station 32 referring to its context records to determine that it is serving at least a threshold amount (e.g., a bandwidth, a number of data packets, a storage size, etc.) of delay-sensitive data to UEs 38.

In some examples, donor base station 12, which helps provide backhaul connectivity between relay base station 32 and the core network 10, may receive an indication that relay base station 32 is serving at least a threshold extent of delay-sensitive traffic. For instance, relay base station 32 may transmit a signaling message over an X2 interface from relay base station 32 to donor base station 12, by way of example, via (i) relay-UE 28, (ii) the radio link between relay-UE 28 and donor base station 12, and (iii) SAE GW 26, and the signaling message may indicate that the extent of delay-sensitive traffic served by relay base station 32 is threshold high. Alternatively, donor base station 12 may receive the signaling message from various other network entities in communication with relay base station 32. For example, as discussed above, various network entities, such as MME 14 for instance, may perform deep packet inspection to determine an extent of delay-sensitive traffic served by relay base station 32. Accordingly, such network entities may transmit the signaling message to donor base station 12 indicating that relay base station 32 serves at least the threshold extent of delay-sensitive traffic. Based on the signaling message, donor base station 12 may determine that relay base station 32 serves at least a threshold extent of delay-sensitive traffic and responsively cause relay-UE 28 to be served by donor base station 12 on a particular carrier frequency. In other examples, donor base station 12 may determine on its own that relay base station 32 serves at least a threshold extent of delay-sensitive traffic by performing deep packet inspection on data packets transmitted between UEs 38 and the packet-switched network 22.

In line with the discussion above, donor base station 12 may operate on a set of carriers ranging from a lowest frequency carrier to a highest frequency carrier, and, based on relay base station 32 serving at least a threshold extent of delay-sensitive traffic, donor base station 12 may select a particular carrier of the set and thereby cause relay-UE 28 to be served on the selected carrier. In other words, because of both (i) relay-UE 28 being a relay-UE rather than an end-user UE and (ii) relay base station 32 serving at least a threshold extent of delay-sensitive traffic, donor base station 12 may select a particular one carrier of the set rather than another carrier of the set on which to serve relay-UE 28.

Further, when selecting the particular carrier on which to serve relay-UE 28, donor base station 12 may select one carrier over another based on the frequencies of the carriers. For instance, donor base station 12 may select a first carrier rather than a second carrier because the first carrier has a lower frequency than the second carrier. In some scenarios, by way of example, donor base station 12 may be serving relay-UE 28 on one carrier frequency of the set, and, responsive to determining that relay base station 32 serves at least a threshold extent of delay-sensitive traffic, donor base station 12 may transition to serving relay-UE on a different, lower carrier frequency of the set. In other scenarios, donor base station 12 may responsively transition to serving relay-UE 28 on the lowest frequency carrier of the set. In still other scenarios, donor base station 12 may already be serving relay-UE 28 on the selected carrier, in which case donor base station 12 may continue to serve relay-UE 28 on the selected carrier or donor base station 12 may transition to serving relay-UE 28 on a different carrier (e.g., due to other reasons such as a carrier load level). Other examples are possible as well.

As noted above, donor base station 12 selecting a lower (or lowest) carrier on which to serve relay-UE 28 may likely increase communication quality due to improved radio frequency propagation on lower carriers. Increased communication quality may result in fewer re-transmissions due to lost or erroneous data packets, which may help to expedite communication between donor base station 12 and relay-UE 28 and thus to expedite communication between donor base station 12 and relay base station 32 for which relay-UE 28 provides wireless backhaul connectivity. Thus, donor base station 12 selecting a lower (or lowest) carrier on which to serve relay-UE 28 may help to reduce overall delay of communications to and/or from relay base station 32 and its served UEs 38.

Figure 2:
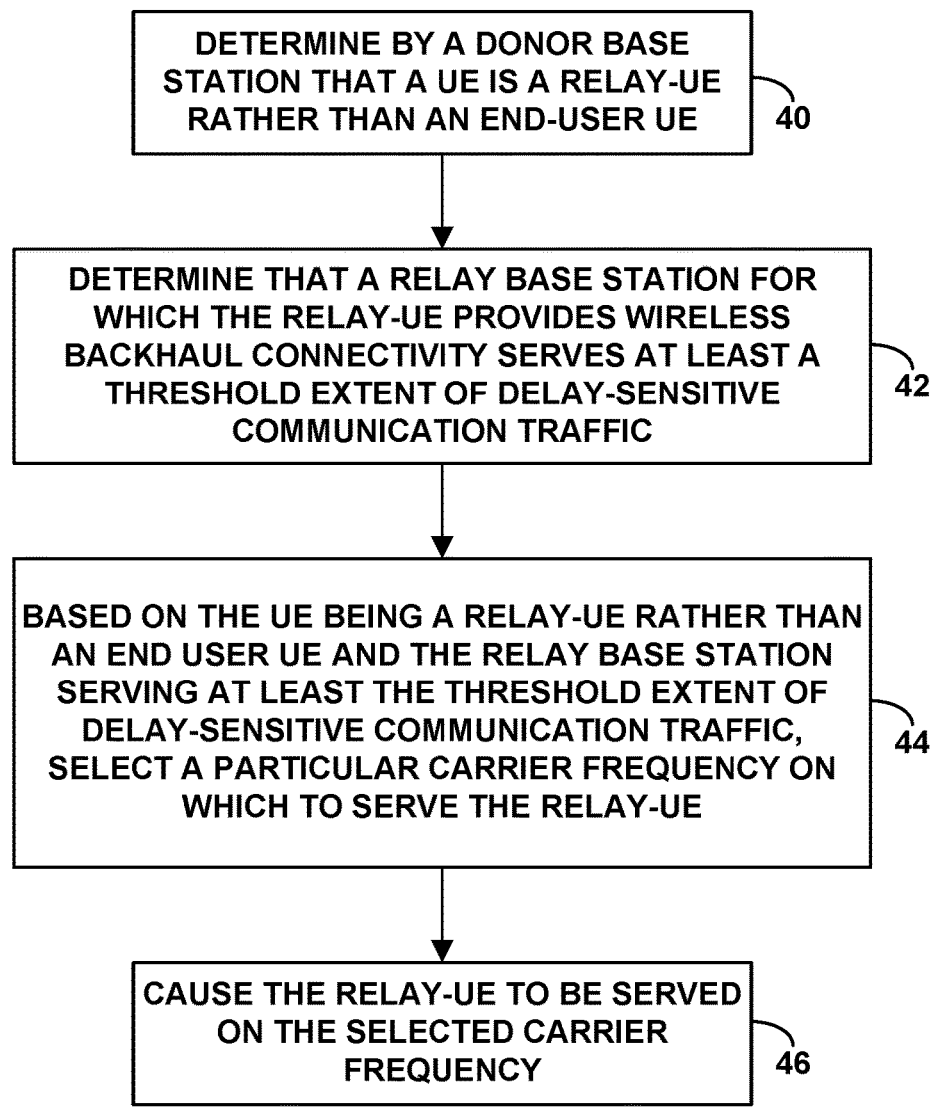
FIG. 2 is a flow chart depicting example operations in accordance with the disclosure.

FIG. 2 is a flow chart depicting features of this method in an example implementation, to help manage air interface communication between a base station and a UE served by the base station. As shown in FIG. 2, at block 40, the method involves a donor base station determining that a UE is a relay-UE (e.g., UE 28), rather than an end-user UE (e.g., UE 30). At block 42, the method involves determining that a relay base station for which the relay-UE provides wireless backhaul connectivity serves at least a threshold extent of delay-sensitive communication traffic. At block 44, the method involves, based on the UE being a relay-UE and the relay base station serving at least the threshold extent of delay-sensitive communication traffic, selecting a particular carrier frequency on which to serve the relay-UE. And at block 46, the method involves causing the relay-UE to be served on the selected carrier frequency.

In this method, the base station could determine that the UE is a relay-UE by considering information such as that described above (e.g., determining from attach signaling or a profile record that a PLMN identifier or other identifier of the UE is one that corresponds with the UE being a relay-UE or otherwise that the UE is a relay-UE) or by being informed by another entity (e.g., an MME) that the UE is a relay-UE. Further, the act of determining that the UE is a relay-UE could involve determining that the UE provides wireless backhaul connectivity for a relay base station.

Further in this method, the act of determining that the relay base station serves at least a threshold extent of delay-sensitive communication traffic could involve (i) determining an extent of delay-sensitive communication traffic served by the relay base station and (ii) determining that the determined extent is at least the threshold extent. In practice, either or both of these determinations could be carried out by the relay base station, by a core network entity such as an SAE GW or an MME, and/or by one or more other entities.

By way of example, in a representative LTE system or the like, when a UE is engaged in a VoIP call or other such delay-sensitive communication, IP packets flowing to and from the UE could flow over a bearer having an associated QCI and/or would be marked with a header value (e.g., differential services point code (DSCP) value) indicating the QCI or otherwise indicating the type of bearer communication, and thus perhaps indicating whether the bearer communication is a type deemed to be delay-sensitive. The relay base station or an SAE GW or other entity through which such packet data flows may thus determine an extent of delay-sensitive communication being served by the relay base station by monitoring an extent to which packets carry data deemed to be delay-sensitive, and/or based on how many bearers for carrying such delay-sensitive traffic the relay base station is currently serving. The relay base station and/or SAE GW could then transmit to the donor base station an associated signaling message (e.g., via an X2 interface from the relay base station, via the SAE GW, to the donor base station, or via an interface from the SAE GW to the donor base station), to direct or otherwise cause the donor base station to select a particular carrier frequency for serving the relay-UE that provides the relay base station with wireless backhaul connectivity.

As noted above, the donor base station may operate on a set of carriers ranging from a lowest frequency carrier to a highest frequency carrier. Thus, the act of selecting a particular carrier frequency on which to serve the relay-UE could involve, responsive to determining that the relay base station serves at least a threshold extent of delay-sensitive traffic, the donor base station selecting the lowest carrier of the set or. Alternatively, the donor base station may select a carrier having a frequency lower than a carrier on which the relay-UE is currently being served. Other examples are possible as well. After selecting the particular carrier, the donor base station may then cause the relay-UE to be served by the donor base station on the selected carrier.

Figure 3:
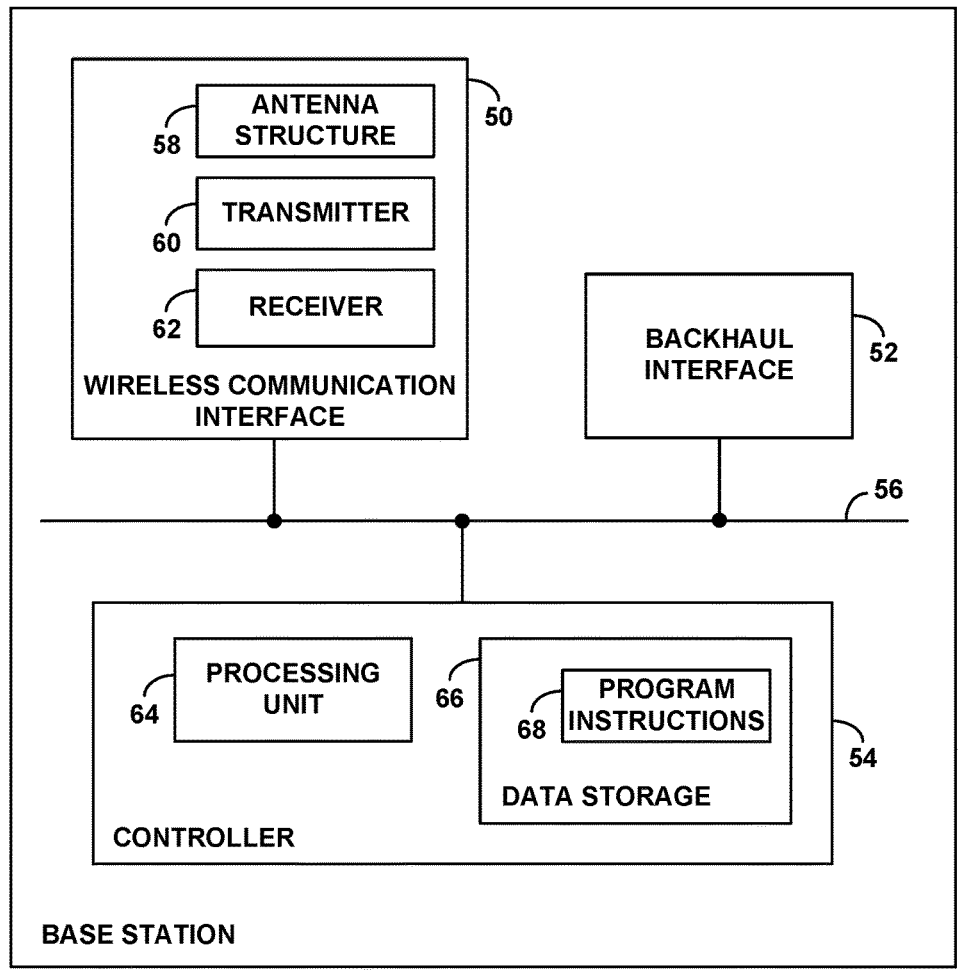
FIG. 3 is a simplified block diagram of an example base station operable in accordance with the disclosure.

FIG. 3 is next a block diagram of an example base station operable to carry out features such as those discussed above. As shown in FIG. 3, the example base station includes a wireless communication interface 50, a backhaul interface 52, and a controller 54. These components are shown communicatively linked together by a system bus or other communication link 56, but it will be understood that the components could alternatively be integrated together or distributed in various ways. For instance, aspects of the controller could be provided in a chipset that implements functions of the wireless communication interface 50. Other examples are possible as well.

As shown, wireless communication interface 50 could include an antenna structure 58, a transmitter 60, and a receiver 62, cooperatively facilitating air interface communication with one or more served UEs. As such, transmitter 60 could be configured to transmit downlink air interface communication in a plurality of downlink channels (such as those noted above for instance), and receiver 62 could be configured to receive uplink air interface communication in a plurality of uplink channels (such as those noted above as well).

Backhaul interface 52 could then include a wired or wireless network interface, such as an Ethernet interface, through which the base station could communicate with other entities of a core network. And as shown, controller 54 could include a processing unit (one or more processors) 64, non-transitory data storage 66, and program instructions 68 stored in the non-transitory data storage and executable by the processing unit to carry out various operations described herein. As such, the controller could be configured to (i) determine whether a UE served by the base station is a relay-UE or rather an end-user UE, (ii) determine that a relay base station for which the relay-UE provides wireless backhaul connectivity serves at least a threshold extent of delay-sensitive communication traffic, (iii) based on the UE being a relay-UE and the base station transmitting the threshold extent of delay-sensitive communication traffic to the UE, select a particular carrier frequency on which to serve the UE, and (iv) cause the UE to be served on the selected carrier frequency.

The presently disclosed method could thus be implemented in an arrangement such as that shown in FIG. 1, including a first base station (e.g., base station 12) and a relay (e.g., relay 34) that includes a relay-UE (e.g., relay-UE 28) and a second base station (e.g., relay base station 32), where the first base station is configured to serve the relay-UE over a first air interface, and where the second base station is configured to serve UEs over a second air interface. In such an arrangement, the first base station could thus be further configured to (i) determine that the relay-UE is a relay-UE rather than an end-user UE, (ii) determine that the second base station serves at least a threshold extent of delay-sensitive communication traffic, (iii) based on the relay-UE being a relay-UE rather than an end-user UE and the second base station serving at least the threshold extent of delay-sensitive communication traffic, select a particular carrier frequency on which to serve the UE, and (iv) cause the relay-UE to be served on the selected carrier frequency.

Exemplary embodiments have been described above. Those skilled in the art will understand, however, that changes and modifications may be made to these embodiments without departing from the true scope and spirit of the invention.

We claim:

1. A method for managing wireless backhaul communication between a donor base station and a relay, wherein the relay comprises a relay user equipment device (relay-UE) and a relay base station, wherein the donor base station serves the relay-UE over an air interface defining a wireless backhaul connection for the relay, and wherein the relay base station serves one or more UEs, the method comprising:

determining that the relay-UE is a relay-UE rather than an end-user UE;

determining that the relay base station serves at least a threshold extent of delay-sensitive communication traffic; and based on the relay-UE being a relay-UE rather than an end-user UE and the relay base station serving at least the threshold extent of delay-sensitive communication traffic, causing the donor base station to transition from serving the relay-UE on a first carrier frequency to serving the relay-UE on a second carrier frequency.

2. The method of claim 1, wherein determining that the relay base station serves at least the threshold extent of delay-sensitive communication traffic comprises determining that at least a threshold number of UEs being served by the relay base station are capable of receiving Voice over Internet Protocol (VoIP) bearer traffic.

3. The method of claim 1, wherein determining that the relay base station serves at least the threshold extent of delay-sensitive communication traffic comprises determining that at least a threshold number of UEs being served by the relay base station are engaged in receiving Voice over Internet Protocol (VoIP) bearer traffic.

4. The method of claim 1, wherein the second carrier frequency is lower than the first carrier frequency, and wherein the donor base station transitions from serving the relay-UE on the first carrier frequency to serving the relay-UE on the second carrier frequency based on the second carrier frequency being lower than the first carrier frequency.

5. The method of claim 1, wherein the donor base station operates on a set of carrier frequencies ranging from a lowest carrier frequency to a highest carrier frequency, wherein the second carrier frequency is the lowest carrier frequency of the set, and wherein the donor base station transitions from serving the relay-UE on the first carrier frequency to serving the relay-UE on the second carrier frequency based on the second carrier frequency being the lowest carrier frequency of the set.

6. The method of claim 1, wherein determining that the relay base station serves at least the threshold extent of delay-sensitive communication traffic is done at least in part by the relay base station.

7. The method of claim 1, wherein determining that the relay base station serves at least the threshold extent of delay-sensitive communication traffic is done at least in part by a core network gateway system through which the delay-sensitive communication traffic passes.

8. A base station comprising:
a transmitter for transmitting downlink air interface communications in a plurality of downlink channels;
a receiver for receiving uplink air interface communications in a plurality of uplink channels; and
a controller, wherein the controller is configured to (i) determine that a user equipment device (UE) served by the base station is a relay-UE rather than an end-user UE, (ii) determine that the base station transmits at least a threshold extent of delay-sensitive communication traffic to the UE, and (iii) based on the UE being a relay-UE and the base station transmitting the threshold extent of delay-sensitive communication traffic to the UE, cause the base station to transition from serving the UE on a first carrier frequency to serving the UE on a second carrier frequency.

9. The base station of claim 8, wherein determining that the base station transmits the threshold extent of delay-sensitive communication traffic to the UE comprises determining that the base station transmits at least a threshold extent of Voice over Internet Protocol (VoIP) bearer traffic to the UE.

10. The base station of claim 8, wherein the UE provides wireless backhaul connectivity for a relay base station that serves one or more end user UEs, and wherein determining that the base station transmits a threshold extent of delay-sensitive communication traffic to the UE comprises determining that at least a threshold number of UEs being served by the relay base station are capable of receiving Voice over Internet Protocol (VoIP) bearer traffic.

11. The base station of claim 8, wherein the UE provides wireless backhaul connectivity for a relay base station that serves one or more end user UEs, and wherein determining that the base station transmits a threshold extent of delay-sensitive communication traffic to the UE comprises receiving a signal indicating that the relay base station serves at least the threshold extent of delay-sensitive communication traffic.

12. The base station of claim 11, wherein the signal indicating that the relay base station serves at least the threshold extent of delay-sensitive communication traffic comprises a signal indicating that at least a threshold number of UEs being served by the relay base station are capable of receiving Voice over Internet Protocol (VoIP) bearer traffic.

13. The base station of claim 8, wherein the second carrier frequency is lower than the first carrier frequency, and wherein the base station transitions from serving the UE on the first carrier frequency to serving the UE on the second carrier frequency based on the second carrier frequency being lower than the first carrier frequency.

14. The base station of claim 8, wherein the base station operates on a set of carrier frequencies ranging from a lowest carrier frequency to a highest carrier frequency, wherein the second carrier frequency is the lowest carrier frequency of the set, and wherein the base station transitions from serving the UE on the first carrier frequency to serving the UE on the second carrier frequency based on the second carrier frequency being the lowest carrier frequency of the set.

15. A wireless communication system comprising:
a first base station configured to serve user equipment devices (UEs) over a first air interface; and
a relay including a relay-UE and a second base station, wherein the first base station is configured to serve the relay-UE over the first air interface, and wherein the second base station is configured to serve UEs over a second air interface,
wherein the first base station is further configured to (i) determine that the relay-UE is a relay-UE rather than an end-user UE, (ii) determine that the second base station serves at least a threshold extent of delay-sensitive communication traffic, and (iii) based on the relay-UE being a relay-UE rather than an end-user UE and the second base station serving at least the threshold extent of delay-sensitive communication traffic, cause the first base station to transition from serving the relay-UE on a first carrier frequency to serving the relay-UE on a second carrier frequency.

16. The wireless communication system of claim 15, wherein determining that the second base station serves at least the threshold extent of delay-sensitive communication traffic comprises determining that at least a threshold number of UEs being served by the second base station are capable of receiving Voice over Internet Protocol (VoIP) bearer traffic.

17. The wireless communication system of claim 15, wherein determining that the second base station serves at least the threshold extent of delay-sensitive communication traffic comprises determining that at least a threshold number of UEs being served by the second base station are engaged in receiving Voice over Internet Protocol (VoIP) bearer traffic.

18. The wireless communication system of claim 15, wherein determining that the second base station serves at least the threshold extent of delay-sensitive communication traffic comprises receiving by the first base station a signal indicating that the second base station serves at least the threshold extent of delay-sensitive communication traffic.

19. The wireless communication system of claim 15, wherein the second carrier frequency is lower than the first carrier frequency, and wherein the first base station transitions from serving the relay-UE on the first carrier frequency to serving the relay-UE on the second carrier frequency based on the second carrier frequency being lower than the first carrier frequency.

20. The wireless communication system of claim 15, wherein the first base station operates on a set of carrier frequencies ranging from a lowest carrier frequency to a highest carrier frequency, wherein the second carrier frequency is the lowest carrier frequency of the set, and wherein the first base station transitions from serving the relay-UE on the first carrier frequency to serving the relay-UE on the second carrier frequency based on the second carrier frequency being the lowest carrier frequency of the set.

* * * * *